Nov. 9, 1971    MASASHI NAGANO    3,618,410
EXPOSED CHANGE SPEED GEAR MECHANISM FOR BICYCLE
Filed May 8, 1970    3 Sheets-Sheet 1

MASASHI NAGANO,
INVENTOR

BY Wendroth, Lind & Ponack
ATTORNEYS

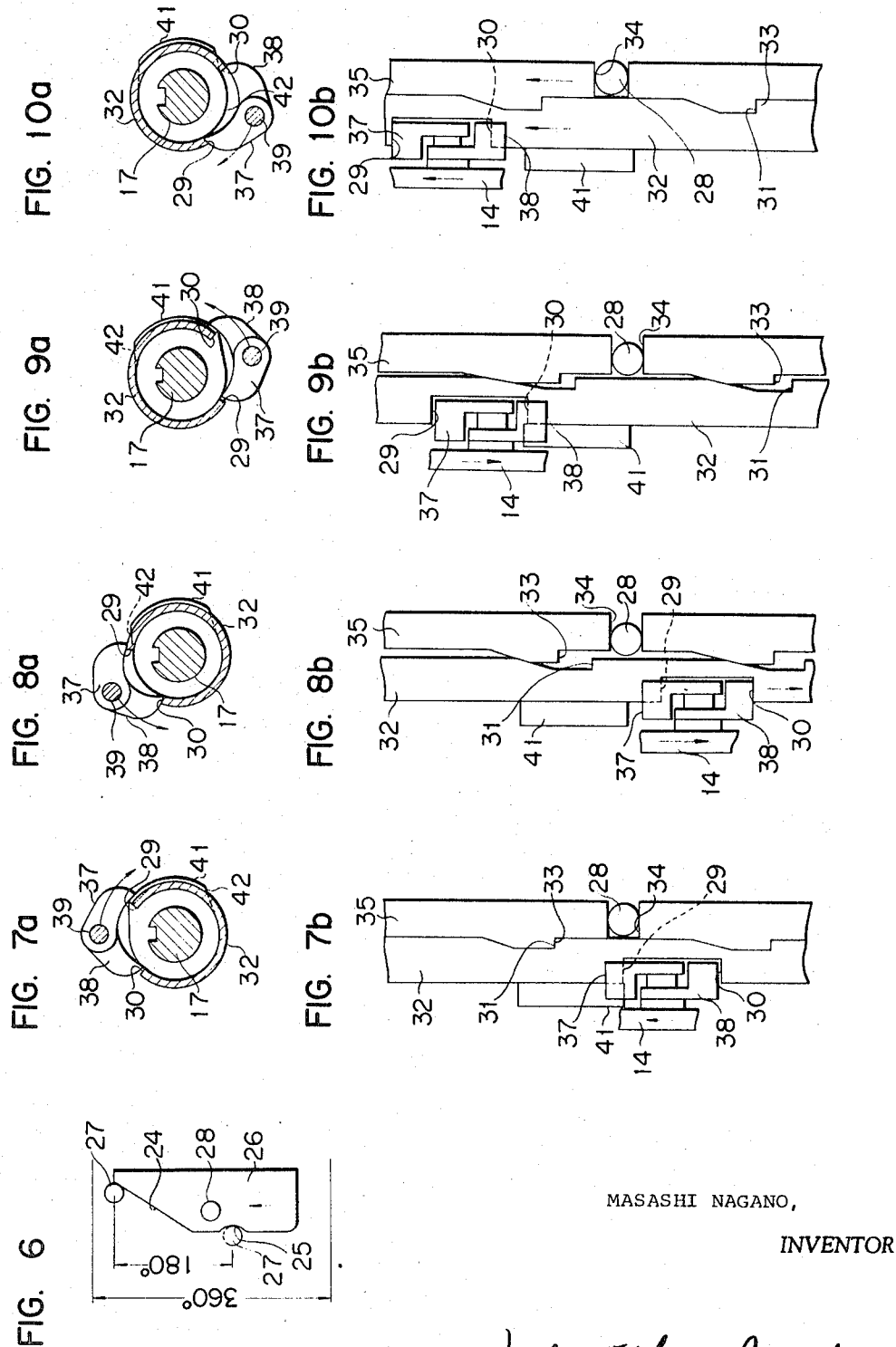

United States Patent Office 3,618,410
Patented Nov. 9, 1971

3,618,410
EXPOSED CHANGE SPEED GEAR MECHANISM FOR BICYCLE
Masashi Nagano, Sakai, Japan, assignor to Shimano Kogyo Kabushiki Kaisha, Osaka, Japan
Filed May 8, 1970, Ser. No. 35,757
Claims priority, application Japan, May 26, 1969, 44/40,870
Int. Cl. F16h 9/24, 11/06
U.S. Cl. 74—217 B                    4 Claims

ABSTRACT OF THE DISCLOSURE

An exposed change speed gear mechanism for a bicycle, of the type in which to effect changeover of the speed ratio a driving chain is moved from one to another of different sized sprockets by translative displacement of a jockey sprocket, characterized in that said displacement of the jocky sprocket is caused by a rotational- and rectilineal-motion mechanism, and between a power transmission member rotated through the driving chain and a driven member of said rotational- and rectilineal-motion mechanism, there are arranged in series a one-way clutch means, and a pair of clutch means for transmitting respective forward and backward rotation of said power transmission member to said one-way clutch means, each of said pair of clutch means being adapted to be automatically brought out of engagement when having been rotated through a predetermined angle under the engaged condition thereof, whereby the speed change can be effected by back-pedalling operation.

---

This invention relates to an exposed change speed gear mechanism for a bicycle, and particularly to that type in which the speed change is effected by derailing a driving chain from one to another of different sized sprockets mounted on a rear wheel hub or a pedal actuated crankshaft.

With conventional exposed change speed gear mechanism of this type, it has been proposed to effect the speed change by manually operating a chain displacing cable control lever. This first method has the disadvantage that the bicycle rider is obliged, when effecting the speed change, to let go his hold of one handle grip during pedaling. In addition, the mechanism is expensive to manufacture and unattractive in appearance because of additional equipments such as the chain displacing cable control lever and the chain displacing cable.

In order to eliminate such disadvantages, it has also been proposed to equip these exposed change speed gear mechanism with an automatic variable speed transmission, the drive ratio of which is automatically changed in response to speed variation in the bicycle. In such second method, however, irrespective of the bicycle rider's will, driving power required to pedal the bicycle changes abruptly simultaneous with automatic ratio changes, so that it is necessary for the rider to adapt himself to such impulsive changes in driving power. To reduce the shock due to such impulsive changes, the difference in the number of teeth between adjacent any two sprockets has to be more decreased, resulting in the disadvantage of necessarily increasing number of transmission ratios in these change speed gear mechanism.

It is therefore an object of the present invention to provide an exposed change speed gear mechanism of this type which does not posses the unsatisfactory disadvantages before referred to, that is to say, to provide a novel form of an exposed change speed gear mechanism in which the speed change can be effected by applying a back pressure to pedals.

The above and further objects and advantages of the present invention will become readily apparent from the following detailed description taken in conjunction with the accompanying drawings, in which similar reference numerals denote corresponding parts throughout the several views, and in which:

FIG. 6 is the projection of the cam surface of an end cam;

FIGS. 7a, 7b, 8a, 8b, 9a, 9b and 10a, 10b are diagrammatic explanatory views showing successive phase of gear ratio shifting operation.

Figure 1:
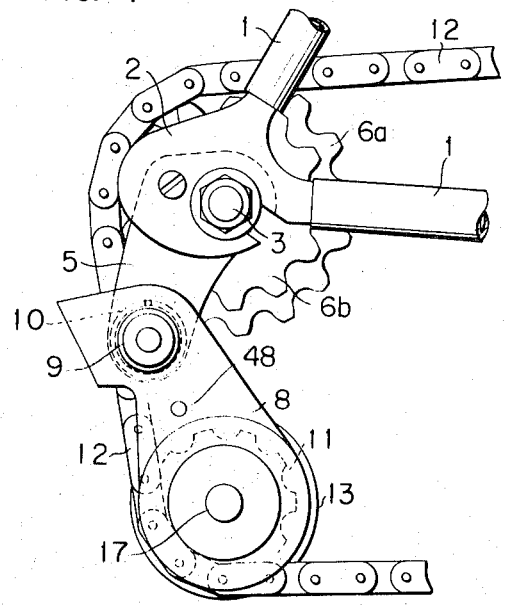
FIG. 1 is a broken side elevation showing the exposed change speed gear mechanism according to the present invention, set to the low gear.
Figure 2:
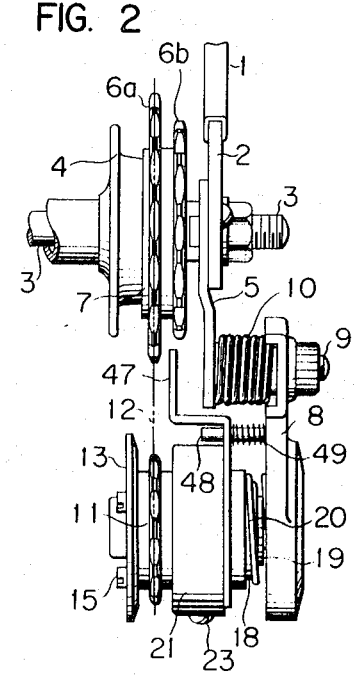
FIG. 2 is a rear view of the exposed change speed gear mechanism shown in FIG. 1.
Figure 5:
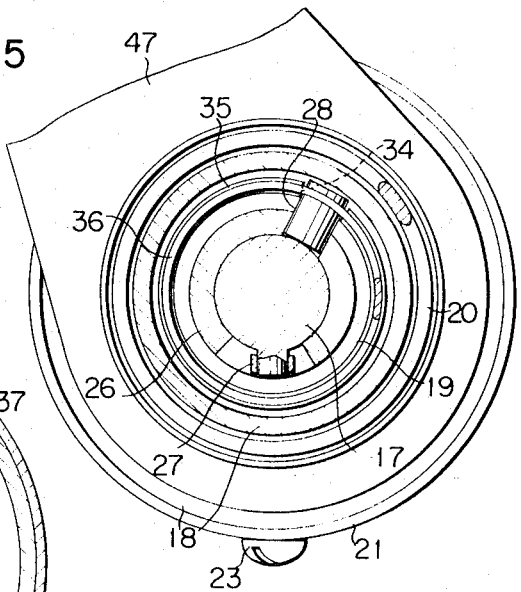
FIGS. 4 and 5 are cross sections taken on lines IV—IV and V—V of FIG. 3, respectively.

Referring to the drawings, particularly FIGS. 1 and 2, there is shown a two-ratio change speed gear mechanism for a bicycle. A rear wheel hub 4 is mounted for rotation on an axle 3 of the rear wheel, the axle being mounted in a stationary condition on a bicycle frame at the rear solid ends 2 of the rearwardly extending bicycle frame members 1, 1 held on threaded end portions of the axle by a suitable means, such as a nut and washer assembly as shown. The hub 4 is provided with a free wheel assembly 7 comprising a plurality of sprocket wheels in this example, two sprocket wheels 6a and 6b each having a different number of gear teeth and arranged in order of the gear tooth number, the outermost sprocket wheel 6b having the smallest number of gear teeth. Secured to the rear solid end 2 by a suitable screw means is a depending arm 5 which at its lower end portion has a depending support arm 8 pivotally mounted by a pivot 9. Disposed around a cylindrical part (FIG. 3) of the support arm 8, between the lower end portion of the arm 5 and the upper end portion of the arm 8 there is a spring 10 which tends to urge the arm 8 to turn on the pivot 9 in clockwise direction in FIG. 1.

A driving chain runs on a chain sprocket (not shown) driven by pedal actuated crankshaft (not shown), a jockey sprocket wheel 11, and selected one of said sprocket wheels 6a and 6b (the inner sprocket wheel 6a in the drawings). The jockey sprocket wheel 11 is provided to guide the driving chain 12 for movement to engage one of the sprocket wheels 6a and 6b and to prevent the driving chain 12 from being loosened, and the jocket sprocket wheel 11 is mounted for rotation in a manner as will be described in detail later on. Since the arm 8 is urged in the clockwise direction in FIG. 1 by the spring 10 as aforementioned, the driving chain 12 engaging the jockey sprocket wheel 11 is constantly maintained under tension. When it is desired to changeover the speed ratio and to displace the driving chain from one of the sprocket wheels 6a and 6b to another, the jockey sprocket wheel 11 is laterally moved in either leftward or rightward direction. The abovementioned constructions are the same in function as those of an exposed change speed gear mechanism heretofore in use.

Referring to FIGS. 3 to 6, there is shown in detail a specific provision for changing over the drive ratio by back-pedalling operation of the chain driving sprocket.

Figure 3:
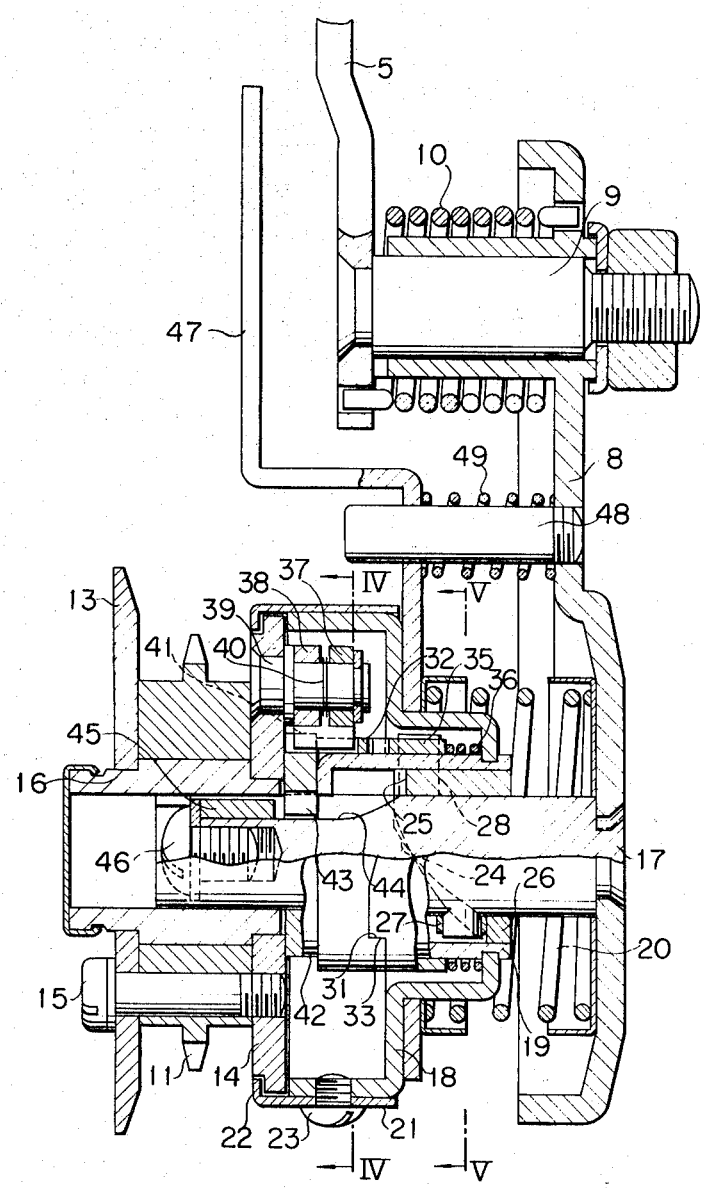
FIG. 3 is a detail sectional view showing the essential parts of the exposed change speed mechanism set to the low gear.

In FIG. 3, on opposite sides of the jockey sprocket wheel 11, there are disposed a chain guide plate 13 and a power transmission member 14 in the form of a plate, both being integrally connected to the jockey sprocket wheel 11 by a screw 15, thus forming a chain guide unit. Said chain guide unit is loosely or slidably mounted through a bush 16 inserted thereinto on the lefthand end portion of a non-rotatable shaft 17 secured to the support arm 8 in a conventional manner. On the substantially mid portion of the shaft 17, there is mounted for rotation and for axial movement a driven sleeve unit which comprises a sleeve member 19 housed in a stepped sleeve member 18 and connected thereto by any suitable means such as caulking. The driven sleeve unit is adapted to have a tendency to be constantly forced in the leftward direction by a compression spring 20 disposed between the arm 8 and the stepped portion of the sleeve member 18. Around the leftwardly extending larger diameter portion of the stepped sleeve member 18, there is securely mounted a ring member 21 by a screw 23, an ear 22 thereof being engageable in a complementary circular recess formed in the plate member 14, thereby to allow the simultaneous axial movements of said driven sleeve unit and said chain guide unit.

An end cam or side cam 26 is mounted within the sleeve member 19 by a pin 28 in a manner allowing the cam surface thereof to abut against a contact roller 27 encircling a radially outwardly extending projection provided in place on the axle 17 and acting as a cam follower, whereby the cam 26 is enabled to move axially according to its rotational movement. Thus, the end cam 26 and the contact roller 27 cooperate with each other to form a rotational- and rectilineal-motion mechanism for causing the driven sleeve unit and the chain guide unit to be moved in an axial direction. As clearly shown in FIG. 6, the projection of the cam surface is outlined by an obliquely extending line 24, a stabilizing arc 25, and straight lines connecting said oblique line and arc.

As best shown in FIGS. 3, 4, 5, 7a, 7b, 8a, 8b, 9a, 9b, 10a and 10b, around the periphery of the sleeve member 19, there are loosely mounted one-way clutch means comprising two ring members 32 and 35 with jaws or teeth 31 and 33, respectively, for unidirectional rotation. Between the righthand inner end of the sleeve member 18 and the driven ring member 35, a coil spring 36 is disposed to normally urge the teeth 33 into engagement with the teeth 31, thereby to ensure that the driven ring member 35 is allowed to make a forward rotation (which is clockwise as seen from the righthand end of FIG. 3) only when the driver ring member 32 is rotated in clockwise direction in FIG. 4.

The driver ring member 32 is further provided with a notch having a pair of contact faces 29 and 30 for forward and backward rotations thereof, and the driven ring member 35 is formed with a groove 34 receiving the extremity of the pin 28 projecting through the sleeve member 19.

The power transmission member 14 is provided with a pair of pawls 37 and 38, for forward and backward rotations of the driver ring member 32, pivotally connected thereto by a common pin 39, the pawls being so urged in opposite directions by a spring 40 as to be assisted the tips thereof to independently come into engagement with the corresponding contact faces 29 and 30 for forward and backward rotations of the ring member 32. It will be understood that the pawl 37 is operative when it is effected forward rotation or rotated in clockwise direction in FIG. 4, whilst the pawl 38 is operative when rotating in the counterclockwise direction.

Figure 4:
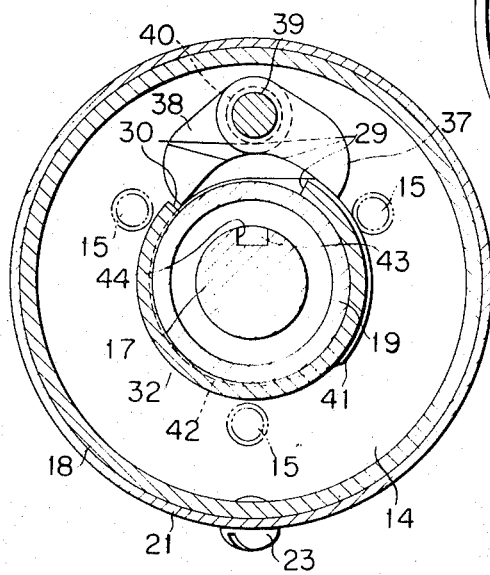

As best shown in FIG. 3, fitted onto the shaft 17, there is a plate cam 42 formed with a lug 43 extending radially inwardly and losely engaging in a longitudinal groove 44 in the non-rotatable shaft 17. Thus, the plate cam 42 may slide along the groove 44 without rotation in the same axial direction in which the sleeve member 19 moves. As seen in FIG. 4, the cam surface of the plate cam 42 is outlined by two concentric arcs connected by straight lines, and the larger diameter part 41 thereof is arranged to cause the pawls 37 and 38 to be independently brought out of engagement with the corresponding contact faces 29 and 30 when the pawls move into contact with the larger diameter part 41. With respect to the engagements and disengagements of the pawls 37 and 38 with and from the clutch ring 32, it is to be understood that, in the case of the pawl 37 being brought out of engagement with the contact face 29 by the larger diameter part 41 of the cam 42, the pawl 38 is adapted to engage the contact face 30 as will be apparent from FIG. 4, and that, in the case of the power transmission member 14 and the pawl 38 having been rotated through at least 180° in reverse or counterclockwise direction in FIG. 4, the pawl 38 is urged out of engagement with the contact face 30 by the cam 42 whilst the pawl 37 is allowed to engage the contact face 29 upon forward rotation thereof. From the foregoing, it will be understood that the pawls 37 and 38 and the respective contact faces 29 and 30 cooperate with the plate cam 42 in forming a pair of clutch means for effecting limited forward and backward rotations of the driver clutch member 32, these clutch means being arranged in series relative to the aforementioned one-way clutch.

Within the groove 44 in the shaft 17, a stopper 45 is inserted and restrained its axial movement by a screw and washer assembly as shown at 46 in FIG. 3 to prevent the plate cam from being moved axially leftwardly to an undue extent. The stopper 45 is so arranged that in case the lug 43 of the plate cam 42 abuts against the stopper 45 the said sleeve unit and chain guide unit are placed in a position in which the low speed drive is effected. Moreover, an arm member 47 (FIGS. 2 and 3) is mounted under pressure around the smaller diameter portion of the sleeve member 18 in a position between the stepped portion of the sleeve member 18 and the compression spring 20. The arm member 47 extends upwards and then bends into the form of L as shown in FIGS. 2 and 3 so that the upright leg of L can be opposed to the outer or righthand side (in FIG. 2) of the driving chain 12 running between the jockey sprocket wheel 11 and the sprocket wheel assembly 7. Therefore, it will be recognized that the arm member 47 can assist the driving chain 12 in its displacement from the high speed sprocket wheel 6b to the low speed sprocket wheel 6a. In addition, as best shown in FIG. 3, the arm 47 is held out of rotation by a pin 48 screw thread fitted to the support arm 8 and projecting through the arm 47. A coil spring 49 slidably encircles the pin 48 thereby to relieve the arm 47 of any impact which would be applied thereon when contacting with the chain 12.

As hereinbefore mentioned, the exposed change speed gear mechanism of the present invention is illustrated in FIGS. 1 to 7 as is the low gear position. When driving in the low gear, the roller 27 mounted in the shaft 17 has contacted with the outermost part of the obliquely extending line 24 (FIG. 6) of the cam surface of the end cam 26, and consequently the driving chain 12 running on the jockey sprocket wheel 11 has been displaced axially leftwardly into engagement with the larger sprocket wheel 6a of the sprocket wheel assembly 7.

In operation, starting with the parts in the aforementioned low gear position as shown in FIGS. 1 to 7, forward rotation of the jockey sprocket wheel 11 is transmitted to the power transmission member 14 and therefore to the pawls 37 and 38. Since the pawl 37 for forward rotation of the ring member 32 is, as shown in FIG. 7, held out of engagement with the contact face 29 of the driver clutch ring member 32 by the larger diameter portion of the plate cam 42, the pawl 37 is inoperatively rotated about the clutch ring member 32 while sliding on the circumferences of the ring member 32 and the larger diameter portion 41 of the plate cam 42. In this time, although the one-way clutch means comprising the pair of clutch ring members 32 and 35 is held in engagement, the said rotational- and rectilineal-motion mechanism is inoperative because the ring member 32 remains stationary. Therefore, the jockey sprocket wheel 11 is freely rotatably held in a position corresponding to the low gear position.

When it is desired to operate in the high gear, the operator applies a back pressure to the pedal cranks by back-pedaling operation so that the jockey sprocket wheel 11 is rotated backwards through at least 180° through the driving chain 12. The backward rotation of the sprocket wheel 11 (which is counterclockwise in FIG. 4) cause the driver ring member 32 to be also rotated in the same direction by the engagement of the pawl 38 with the contact face 30 as will be apparent from FIG. 8, whereupon the driven member 35 is forced in the rightward direction in FIGS. 3 and 8 against the action of the spring 36, whereby the end cam 26 is prevented from its being rotated in the counterclockwise direction by the driven ring member 35. When the driver ring member 32 has been rotated backwardly through at least 180° and reached to a position as shown in FIG. 9, the tooth 31 in the ring member 32 comes again into engagement with the next tooth 33 in the ring member 35 while at the same time the pawl 38 is disengaged from the contact face 30 by the larger diameter portion 41 of the plate cam 42, thus positioning the related part in a preparatory position for changing the drive speed from low to high gear. Then, upon forward rotation of the jockey sprocket wheel 11, the cam 26 will be forcedly rotated in the clockwise direction through the power transmission member 14, the pawl 37, the contact face 29, the driver ring member 32, the driven ring member 35 and the pin 28 as will be observed from FIGS. 3 and 10 while sliding axially rightwardly against the action of the compression spring 20 due to frictional cooperation of its obliquely extending cam surface 24 with the roller 27 mounted to the shaft 17. As a result, the sleeve members 18 and 19, the ring member 21, the power transmission member 14 and the jockey sprocket wheel 11 are all moved as a whole in the same direction as the end cam 26, with the attendant derailing of the driving chain 12 from the low speed sprocket wheel 6a to the high speed sprocket wheel 6b. In addition, when the cam 26 has been rotated in the forward direction through at least 180°, the stabilizing recessed portion 25 of the cam 26 comes in engagement with the roller 27 (shown in FIG. 6 by the chain line) mounted to the shaft 17 thereby to maintain the now established high gear condition stable, and the related parts are set again to the primary position, as shown in FIG. 7, for the next derailing operation to the low gear.

Shifting back into the low gear is accomplished in the same manner by back-pedaling operation. When the power transmission member 14 has been rotated backwardly through 180°, the related parts are set to the preparatory position for the low gear as shown in FIG. 9. Should the bicycle operator thereafter pedals so as to rotate the power transmission member 14 forwardly through 180°, the end cam 26 is also rotated in the same direction through about 180° while sliding axially leftwardly in FIG. 3 into a position corresponding to the low gear position.

From the foregoing, it will be understood that although the said rotational- and rectilineal-motion mechanism is of such construction, in which the end cam 26 per se is adapted to move rectilinearly according to this rotation, it may be of such construction in which an end cam is adapted to be prevented from its axial movement but allowed its rotational movement by which the desired rectilineal movement of a jockey sprocket wheel is effected. In other words, the rotational- and rectilineal-motion mechanism may be of such construction in which a rotational motion is converted into a rectilineal motion.

In the aforementioned embodiment, the displacement of the driving chain 12 is effected by firstly back-pedaling so as to set the related parts to the preparatory position for the change-over to the desired drive ratio and then rotating the sprocket wheel 11 forwardly through at least 180°.

In contradistinction to the above, according to another embodiment, the displacement of the driving chain 12 is directly effected by back-pedaling operation and thereafter, upon forward rotation of the sprocket wheel 11, the related parts are set to the preparatory position for the next changeover of the drive ratio as will be described hereinafter.

Figure 11:
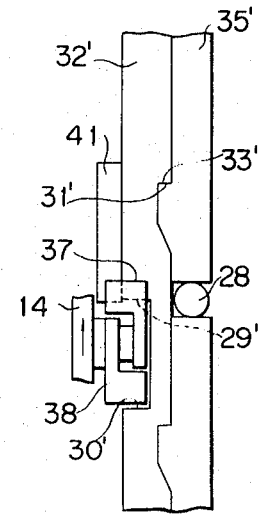
FIGS. 11 and 12 are diagrammatic views corresponding to those of FIGS. 7 to 10, showing a different modification of the present invention.
Figure 12:
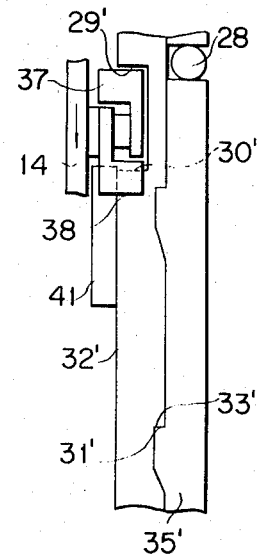

Referring to FIGS. 11 and 12, there is shown a modified form of the present invention, wherein unlike the previously described embodiment the engagement between a tooth 31' in a driver ring member 32' and a tooth 33' in a driven ring member 35' is released only in the case of the forward rotation of the driver ring member 32' and the cam 42 is formed with a similar oblique cam surface 24 which is reversed in direction of inclination as compared with that of the cam of the previously described embodiment. It will be recognized from FIG. 11 that, when a power transmission member 14 is rotating in the forward direction under the low gear condition, the pawl 37 is held inoperative or out of engagement with a contact face 29' by the larger diameter portion 41 of the cam 42, so that a clutch means comprising driver and driven ring members 32' and 35' is stationary even it is in clutch engagement.

When it is desired to operate in the high gear, the bicycle operator effects the backward rotation of the power transmission member 14, whereupon a pawl 38 is brought into engagement with a contact face 30' and therefore causes the driven ring member 32' together with the driven ring member 35' to be rotated in the counterclockwise direction. Such backward rotation of the clutch means is transmitted through a pin 28 to a rotational- and rectilineal-motion mechanism to cause the jockey sprocket wheel 11 to be moved axially rightwardly through the various transmitting members, resulting in the changeover of the drive ratio from low to high as shown in FIG. 12. Moreover, the shift to the low gear condition can be effected in the same manner by moving the jockey sprocket wheel 11 in the axial direction. In addition, with such embodiment in which the shift is directly effected upon backward rotation of the jockey sprocket wheel 11, it is necessary to arrange the jockey sprocket wheel in a position in which it engages an upper run of the driving chain 12.

Further, it should be appreciated that the present invention may be applied to an exposed change speed gear mechanism in which to obtain variation in the gear ratio, a plurality of driving sprocket wheels mounted on a pedal actuated crankshaft are adapted to be selectively engaged by a driving chain. As will be understood, if such exposed change speed gear mechanism is of the type in which the shift from one gear to the other is brought by a forward rotation of the driving chain after setting the related parts in a preparatory position for the shift by a backward rotation of the driving chain, it is preferable to place a jockey sprocket wheel in a position in which it engages an upper run of the driving chain in the vicinity of the driving sprocket wheels. On the contrary, if the mechanism is of the type in which the shift is directly effected by the backward rotation of the driving chain, it is preferable to place the jockey sprocket wheel in a position in which it engages a lower run of the driving chain in the vicinity of the driving sprocket wheels.

From the foregoing description, the operation and utility of the mechanism will be apparent. It will therefore be appreciated that, according to the present invention, the mechanism is of very simple and compact construction without accessary members such as a chain displacing cable, a control lever therefor, etc., and that the desired two-ratio speed change may be attained by back-pedaling operation instead of manipulating the control lever.

What I claim is:

1. An exposed change speed gear mechanism for a bicycle, of the type in which to effect changeover of the speed ratio a driving chain is moved from one to another of different sized sprockets by translative displacement of a jockey sprocket, comprising
   (a) a power transmission member rotatable with the jockey sprocket in forward and backward directions,
   (b) a pair of clutch means driven by said power transmission member in the same direction, one of said clutch means being brought into engagement upon the forward rotation of said power transmission member, the other being brought into engagement upon the backward rotation of said power transmission member, said engagements of said clutch means being released when the same have been rotated through a predetermined angle under the engaged conditions thereof,
   (c) one-way clutch means for unidirectional rotation arranged in series relative to said pair of clutch means,
   (d) means for producing a rectilineal motion when a rotational motion is transmitted thereto, said rotational motion being given by said one-way clutch means, and
   (e) means for transmitting said rectilineal motion to said jockey sprocket to effect said translative displacement thereof, whereby the desired changeover of the speed ratio can be effected by back-pedaling operation.

2. An exposed change speed gear mechanism for a bicycle as claimed in claim 1, wherein said one-way clutch means comprises a driving ring member driven by said pair of clutch means alternatively and a driven ring member rotatable only in forward direction.

3. An exposed change speed gear mechanism for a bicycle, as claimed in claim 1, wherein said one-way clutch means comprises a driving ring member driven by said pair of clutch means alternatively and a driven ring member rotatable only in backward direction.

4. An exposed change speed gear mechanism for a bicycle as claimed in claim 1, wherein said rectilineal motion producing means comprises a rotatable and slidable end cam with an oblique cam surface rotated through a pin by said one-way clutch means and a stationary cam follower engagable with said cam surface, and said rectilineal motion transmitting means is a sleeve unit comprising two sleeve members nesting one in another, the inner sleeve member thereof having said one-way clutch means mounted therearound, the outer sleeve member accommodating said pair of clutch means, said one-way clutch means and said rectilineal motion producing means.

References Cited
UNITED STATES PATENTS

| | | | |
|---|---|---|---|
| 2,010,248 | 8/1935 | Winkler | 74—217 B |
| 3,081,641 | 3/1963 | Iseman | 74—217 B |
| 3,111,855 | 11/1963 | Juy | 74—217 B |
| 3,448,628 | 6/1969 | Shimano et al. | 74—217 B |
| 3,465,606 | 9/1969 | Ashner | 74—217 B |
| 3,492,883 | 2/1970 | Maeda | 74—217 B |

LEONARD H. GERIN, Primary Examiner